United States Patent
Debelleix

(10) Patent No.: US 7,255,269 B2
(45) Date of Patent: Aug. 14, 2007

(54) DEVICE AND METHOD OF RECOGNIZING AT LEAST ONE INDIVIDUAL, THE CORRESPONDING ACCESS CONTROL DEVICE AND SYSTEM AND APPLICATIONS THEREOF

(75) Inventor: Olivier Debelleix, St. Maximin la Ste Baume (FR)

(73) Assignee: Atmel Nantes SA, Nantes Cedex (FR)

( * ) Notice: Subject to any disclaimer, the term of this patent is extended or adjusted under 35 U.S.C. 154(b) by 337 days.

(21) Appl. No.: 10/486,803

(22) PCT Filed: Aug. 13, 2002

(86) PCT No.: PCT/FR02/02874

§ 371 (c)(1),
(2), (4) Date: Aug. 30, 2004

(87) PCT Pub. No.: WO03/017210

PCT Pub. Date: Feb. 27, 2003

(65) Prior Publication Data

US 2005/0012592 A1 Jan. 20, 2005

(30) Foreign Application Priority Data

Aug. 14, 2001 (FR) .................................. 01 10832

(51) Int. Cl.
*G06K 5/00* (2006.01)
(52) U.S. Cl. ...................... 235/382; 713/165; 713/182; 713/186
(58) Field of Classification Search ................ 235/382; 713/165, 182, 186
See application file for complete search history.

(56) References Cited

U.S. PATENT DOCUMENTS

| 5,864,296 A | 1/1999 | Upton |
| 6,070,796 A | 6/2000 | Sirbu |
| 2004/0236954 A1* | 11/2004 | Vogt et al. .................. 713/186 |

FOREIGN PATENT DOCUMENTS

| EP | 1 113 405 | 7/2001 |
| FR | 2 774 793 | 8/1999 |
| WO | WO 98 11750 | 3/1998 |
| WO | WO 00 65770 | 11/2000 |
| WO | WO 02 01328 | 1/2002 |

* cited by examiner

*Primary Examiner*—Michael G. Lee
*Assistant Examiner*—Allyson N Trail
(74) *Attorney, Agent, or Firm*—Westman, Champlin & Kelly

(57) ABSTRACT

The invention relates to a device and method for the recognition of at least one individual and to the corresponding access control device and system and application thereof. The inventive recognition device comprises a one-piece integrated circuit which is produced by integrating the following elements on a silicon substrate: at least one biometric information sensor; means of processing said biometric information; cryptographic means which deliver at least one piece of encrypted data that is representative of at least one part of said biometric information and/or a corresponding piece of recognition information; and protection means that block access to data in transit, stored and/or processed in said one-piece integrated circuit in order to create a secure perimeter. In this way, the data exchanged by said sensor(s), processing means and cryptographic means, and particularly the aforementioned biometric information, are only saved in the one-piece integrated circuit and cannot be accessed from outside. Moreover, only encrypted data are delivered to the outside from said one-piece integrated circuit.

21 Claims, 2 Drawing Sheets

DEVICE AND METHOD OF RECOGNIZING AT LEAST ONE INDIVIDUAL, THE CORRESPONDING ACCESS CONTROL DEVICE AND SYSTEM AND APPLICATIONS THEREOF

CROSS-REFERENCE TO RELATED APPLICATION

This application is a Section 371 National Stage Application of International Application No. PCT/FR02/02874 filed Aug. 13, 2002 and published as WO 03/017210 on Feb. 27, 2003, not in English.

FIELD OF THE INVENTION

The field of the invention is that of biometrics, that being the recognizing or identification of individuals through some of their biometric characteristics (fingerprint, voiceprint, eye imprint, etc.), notably in applications providing monitored access to a site, objects and/or data.

More precisely, the invention relates to the securing of the implementation of biometric sensors.

BACKGROUND OF THE INVENTION

The applying of the recognition of biometric characteristics for access monitoring is a well-known technique per se, as much for access to a site or a protected room as for data stored in a database. Such systems comprise a sensor, for example to read an image of a fingerprint, and means of processing and analyzing this image, deciding on the positive or negative recognition of the individual.

On first impressions, this technique is convincing, as it seems to guarantee that the individual present is the individual that the system has identified, and not an ill-intentioned third party. A more thorough analysis, however, demonstrates that this is not the case. Indeed, it is relatively simple, for a hacker, to bypass the system, for example by picking up the signal transmitted by the sensor during the recognition of an authorized individual, and then reproducing the same signal to give it to the means of processing and analysis. The latter thus conclude on a positive recognition, in the absence of the authorized individual.

It is therefore clear that the known systems do not provide a sufficient level of security for a variety of applications. That is principally due to the fact that these systems use separate elements, which implies the transmitting of sensitive data easily accessible and re-exploitable between these elements.

We considered bringing together within one box, or on one printed circuit, these separate elements. However, that does not alter the problem, even if it does render it slightly more complicated. The sensitive data flows on a bus, for example between the sensor which picks up the imprint and the microprocessor which processes and analyses it. It is now possible, for an ill-intentioned person, with relatively uncomplicated means, to detect the signals flowing on this bus, or to transmit via this bus false data to the microprocessor. It is to be noted that the identification and analysis of this problem are an integral part of this invention.

Over and above this high vulnerability of the current systems, there is also the major problem of protecting private and highly confidential information which constitute the biometric information. Indeed, due to the accessibility of the flows of data coding the biometric characteristics, it is possible to illicitly create a database, for use prohibited by legislation. It would, for example, be conceivable to use such a database to extract individual characteristics, which would allow commercial targeting not authorized by the individual.

As long as these problems have not been resolved, it is naturally neither desirable nor conceivable that these biometric techniques are widely used, for example in governmental or banking applications.

The invention notably has as an objective to offer a solution to these problems of prior art techniques.

More precisely, an objective of the invention is to provide a technique that allows the usage of biometric characteristics in a safe and reliable manner. Notably, the invention has the objective of providing such a technique, which does not allow a potential hacker to collect and reuse the biometric data of a third party.

Another objective of the invention is to provide such a technique, guaranteeing the confidentiality of the biometric imprints of an individual.

The invention also has the objective of providing such a technique, which can be industrially implemented on a large scale, with an acceptable production cost.

BRIEF SUMMARY OF THE INVENTION

These objectives, as well as others which appear later, are reached according to the invention with the help of a device for recognizing at least one individual, comprising, in a monolithic integrated circuit obtained via the integration on the same silicon substrate of:

at least one biometric information sensor;

means of processing said biometric information;

cryptographic means, transmitting at least one piece of encrypted data representing at least one part of said biometric information and/or one piece of corresponding recognition information; and means of protection, denying access to the flowing data, stored and/or processed in said monolithic integrated circuit, to create a secured perimeter;

so that the data exchanged by said sensor(s), said means of processing and said cryptographic means, and notably said biometric information, is solely kept in said monolithic integrated circuit, remaining inaccessible from the outside, and that only the encrypted data is transmitted to the outside of said monolithic integrated circuit.

Thus, access is denied to the biometric information, whether that be to reuse it for ill-intentioned reasons or to record it. We therefore efficiently guarantee the confidentiality and security, in other words the accuracy of the identification.

The fact that all the means are grouped together in a single-piece module renders access to the data flowing on the inside impossible. The cryptographic means mean that only data that cannot be interpreted by a third party is emitted. According to the invention, this unique single-piece module is a monolithic integrated circuit. This new and inventive approach in this technical field proves to be very efficient, in terms of protection, and industrially simple to implement, whilst allowing small and low energy consumption devices to be provided.

Said sensor(s) can be integrated onto silicon. This allows for simplified manufacturing (applying an additional layer corresponding to the sensor during the manufacturing of the component for example) and most of all good securing of all the parts.

Finally, said monolithic integrated circuit comprises protection, or securing means, denying access to the flowing data, stored and/or processed in the said monolithic integrated circuit, so as to define a secured perimeter. This allows reinforcing still 20 further the security, that is best guaranteeing nonaccess by third parties to biometric information.

Said means of protection deny access to data comprising at least one of the means notably belonging to the group comprising:
- means of monitoring the mains supply of said monolithic integrated circuit;
- means of monitoring the characteristics of a clock synchronizing the operating of said device;
- means of controlling the temperature of said monolithic integrated circuit;
- means of scrambling the electromagnetic interference induced by the internal processing of the device;
- means of anti-radiation protection;
- means of electromagnetic field shielding;
- means of physical shielding intended to prevent and/or detect any physical and/or electric attempt at interfering with the device;
- means of scrambling flowing information, processed and/or stored in the monolithic integrated circuit.

Said biometric information processed by the device of the invention can be of any adequate type. They can in particular belong to the group comprising:
- fingerprints;
- voiceprints;
- eye imprints;
- morphologic characteristics;
- behavioural characteristics.

Combinations of this information are of course possible.

Advantageously, said sensor(s) can notably belong to the group comprising:
- heat sensors;
- pressure sensors;
- light sensors;
- movement detectors;
- radiation detectors:
- electric characteristic sensors:
- physical entity sensors.

Furthermore, said means of processing advantageously comprise means of formatting at least one signal transmitted by at least one of said sensors and means of extracting said formatting signal of at least one pertinent character, creating a digital signature making it possible to identify an individual in a unique manner.

According to an advantageous embodiment of the invention, said cryptographic means provide a cryptographic signature, calculated with the help of at least one key stored in a storage unit of said monolithic integrated circuit.

Preferably, said cryptographic signature also takes into account at least one random parameter generated and communicated by means independent of said monolithic integrated circuit.

It can for example be data provided by an access monitoring device, time-stamped data and/or data provided by the user. This makes it possible to avoid the risk of "replay" by a third party who could have recorded the encrypted signature.

According to this signature, external means can implement the recognizing of an individual.

According to a particular variation of the invention, the device can carry out this operation itself. In which case, it comprises means of recognizing at least one individual, according to the reference data stored in said monolithic integrated circuit.

Preferably, said means of recognition transmit a piece of recognition information, indicating if an individual is or is not recognized, said recognition information being encrypted before being transmitted to the outside of said module.

Furthermore, the device of the invention advantageously comprises, in said monolithic integrated circuit, a storage unit comprising at least one of the elements belonging to the group comprising:
- at least one cryptographic key;
- at least one secured processing mechanism of cryptographic keys;
- at least one piece of reference data representative of an individual;
- data and/or programmes necessary for the implementation of the means present in said monolithic integrated circuit.

Said storage unit advantageously comprises at least one digital data memory, belonging for example to the group comprising the flash, the EEPROM, the EPROM, the ROM, the RAM, the FERAM, the MRAM and the magnetic memories.

According to a particular embodiment of the invention, the monolithic integrated circuit comprises a fingerprint sensor, transmitting an imprint image, means of processing the generated image and means of extracting details on the processed image.

It is a simple and efficient embodiment. Preferably, said cryptographic means implement at least one equipment calculation booster.

The invention also relates to a method of recognizing at least one individual, implementing one or more devices such as described above. Such a method notably comprises the following stages, integrally implemented on the inside of a monolithic integrated circuit:
- obtaining biometric information of said individual, with the help of at least one sensor integrated into said monolithic integrated circuit;
- processing said biometric information;
- encrypting at least a part of said biometric information and/or a piece of corresponding recognition information;
- transmitting the encrypted data to the outside, so that the data exchanged by said sensor(s), said means of processing and said cryptographic means, and notably said biometric information, is solely kept in said monolithic integrated circuit, remaining inaccessible from the outside, and that only encrypted data is transmitted to the outside of said monolithic integrated circuit.

Advantageously, said monolithic integrated circuit defines a secured perimeter, by implementing means of protection denying access to the flowing data, stored or processed in said monolithic integrated circuit.

Preferably, such a method implements at least one recognition device comprising said monolithic integrated circuit and at least one access monitoring device linked up to said device, capable of receiving and processing encrypted data transmitted by said recognition device(s), and consequently of authorizing or refusing access to at least one piece of data, at least one object and/or at least one site.

The invention further relates to such access monitoring devices, comprising means of access authorization or refusal to at least one piece of data, at least one object and/or at least one site, and means for receiving and processing encrypted data transmitted by at least one device for recognizing at least one individual such as described above.

The invention also relates to the access monitoring systems to at least one piece of data, at least one object and/or at least one site, implementing at least one device for recognizing at least one individual and at least one access monitoring device such as described above.

Finally, the invention relates to applications of at least one such device for recognizing at least one individual to at least one of the fields belonging to the group comprising:
- physical access monitoring;
- computer data access monitoring;
- identifying of the holder of said device;
- implementing of mobile objects;
- banking services;
- electronic signatures.

BRIEF DESCRIPTION OF THE DRAWINGS

These characteristics and advantages, as well as others, will become clearer on reading the following description of a preferred embodiment of the invention, given simply as an illustrative and non-restrictive example, and of annexed drawings, among which.

DETAILED DESCRIPTION OF PREFERRED EMBODIMENTS

The invention therefore relates to a new approach of biometric systems, resting notably on the implementation of cryptographic means, allowing for an adapted processing of sensitive information, related to an individual, so that a non-encrypted biometric imprint can never be accessed by a third party.

According to the invention, as will be seen later on, the means implemented are grouped together in a single "chip", on which is notably integrated the implemented sensor(s). There is therefore no flow of sensitive information (notably the biometric imprint) outside of the chip, and it is therefore impossible to pick up the information or to fraudulently replace it.

In other words, the invention provides for the 20 integration of the complete biometric system into a monolithic integrated circuit, defining a perfectly protected environment, corresponding to a secured perimeter beyond which the biometric imprint of an individual does not go.

Means of protection are also provided for, in the integrated circuit, to reinforce the security, by denying access to the data.

Figure 1:
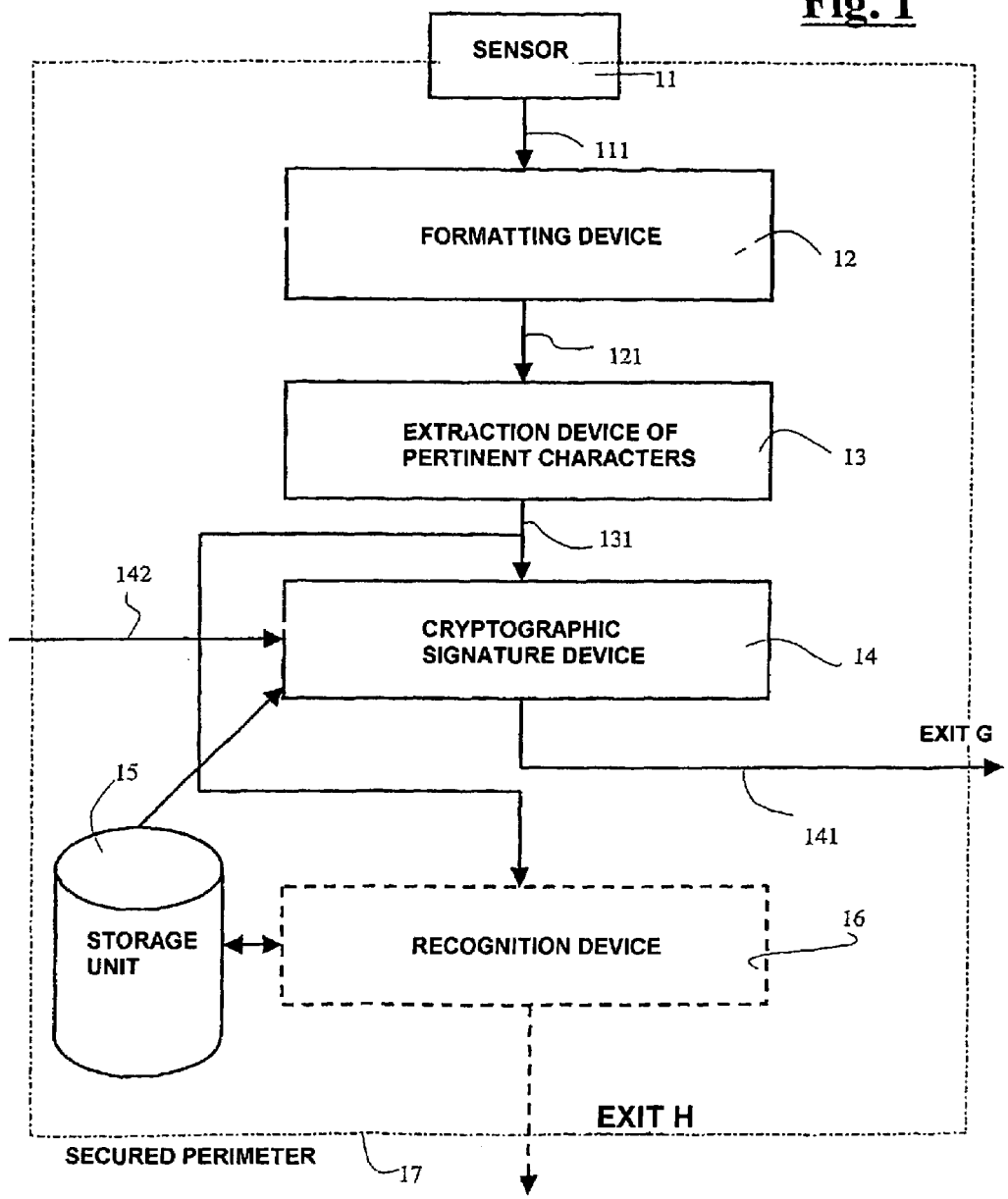
FIG. 1 is a block diagram illustrating the structure of a recognition device according to the invention.

FIG. 1 presents, in a block diagram, an embodiment of a device according to the invention, detailing the different operating elements that are on the monolithic integrated circuit.

This device first of all comprises a sensor 11. It can be any type of electronic component, without any restrictions, as long as it can be integrated onto silicon, allowing the conversion of a piece of physical iometric information characteristic of an individual (for example, fingerprint, voiceprint, eye imprint, etc.) into a piece of electronic information that can be used by a digital jobstring. These sensors can notably belong to the group comprising:
- heat sensors;
- pressure sensors;
- light sensors;
- movement detectors;
- radiation detectors:
- electric characteristic sensors:
- physical entity sensors.

They allow for example the detection of the following biometric information:
- fingerprints; voiceprints; eye imprints; morphologic characteristics;
- behavioural characteristics.

In some particular cases, several sensors can be combined into a single device.

The electric signal 121 transmitted by the sensor supplies the means 12 of formatting. It can notably be an analog or digital element allowing for the processing of information issued from the sensor to adapt it to the extraction device of pertinent characters. It can, for example, consist of an image processing unit that authorises the reconstruction of the image of the biometric character imperfectly captured by the sensor, so that it complies with the original image.

The formatting signal 121 is then directed towards the means 13 of extraction of pertinent characters. These means allow, via digital processing according to the algorithms dependent on the processed physical character, the large amount of information captured by the sensor to be compressed, by extracting a sort of digital signature representative, in a unique manner, of the individual.

According to the invention, this secured signature does not go beyond the secured perimeter 17, detailed afterwards, that is the monolithic integrated circuit. It is therefore never accessible. Only an encrypted version 141 is transmitted towards the outside.

For this purpose, the device of the invention 20 comprises, in the monolithic integrated circuit, cryptographic means 14; which calculate a cryptographic signature (encryption) of the digital information representing the pertinent characters by using a cryptographic algorithm, such as for example one of the RSA, Elliptic Curve, DES, Triple DES, or AES algorithms.

The keys necessary to carry out this process are stored in a secured storage unit 15.

The calculated cryptographic signature 141 preferably takes into account not only the digital information representing the pertinent characters, but also at least one random parameter 142 generated and communicated by the external environment of the system, so as to avoid the possibilities of "replay". Indeed, a cryptographic signature that has been recorded must not be reusable. This random parameter can be a piece of data determined by an access monitoring device which communicates with the device (and which consequently validates the signature), a piece of date-stamped data, a code provided by the individual, etc.

The calculated signature 141 is transmitted towards the outside via an exit 142.

Thus, only the signature and the random parameter(s) flow outside the secured perimeter. They allow the recognition of the signature via an adapted external access monitoring device.

According to a variation of the invention, we have provided for, on the inside of the monolithic integrated circuit, means of recognition 16. They are optional means, which render the device autonomous and allow the recognizing of an individual through the searching for the pertinent characters obtained upon the capture of the biometric information in a reference character base, representing for example a set of authorized individuals, stored in the secured storage unit 15.

The outlet 161 makes it possible to indicate if the individual is recognised. The information 151 can (and should) be a cryptographic signature so that the result of the search cannot be corrupted or falsified. The storage unit 15, which can be of any type of memory (flash; EEPROM, EPROM, ROM, RAM, FERAM, MRAM, magnetic), encloses all the information (data and programmes) necessary for the management of the entire system. It contains, in particular, the keys necessary for the integrated cryptographic algorithms, and all of the mechanisms necessary for the secured operating of the keys (loading, generating, etc.).

If the recognition unit is integrated in the monolithic integrated circuit, this storage unit 15 can also contain a reference pertinent character base making it possible to determine if an individual is part of a set of authorized individuals.

The recognition device of the invention can also contain, on the inside or outside of the secured perimeter, means specific to one or more applications for which it is intended (storage of data, for applications such as mobile phones, personal information, for applications such as "citizenship cards" or health related cards, account management, for applications of electronic cash-cards, communication management, with a remote device, such as a server or a machine, etc.).

Advantageously, all of the means detailed above are placed on the inside of a secured perimeter 17, that is a monolithic integrated circuit. It is advisable to note that it is a physical perimeter within which a certain number of means have been installed so as to prohibit access to information which flows, is stored or processed by all known means of attack.

The means of securing, or protecting, can notably comprise:
 means of monitoring the mains supply of said device;
 means of monitoring the characteristics of a clock synchronizing the operating of said device;
 means of controlling the temperature of said device;
 means of scrambling the electromagnetic interference introduced by the internal processing of the device;
 means of anti-radiation protection;
 means of electromagnetic field shielding;
 means of physical shielding intended to prevent and/or detect any physical and/or electric attempt at interfering with the device;
 means of scrambling flowing information, processed, or stored in the device.

By way of a particular illustration, we hereafter study the case of the recognizing of a fingerprint. In this case:
 the sensor 11 can be a heat sensor;
 the means 12 of formatting carries out a digital processing of the corresponding image;
 the means 13 of extraction of pertinent characters comprise a calculator performing the extraction of details of a fingerprint.

As aforementioned, the device of the invention is made in the form of an integrated circuit. The implementation of the device thus consists in assembling on a single component of a fingerprint sensor, of a generated image processing circuit, of a pertinent parameter extraction circuit (IP) based for example on the principle of detailed extraction, and of a secured micro-controller making it possible to manage all of the parts, as well as the cryptographic calculation (by means of adapted equipment boosters).

The recognition of the imprint can be generated outside of the component or with the help of adapted software. The storage unit 15 will be composed for example of a flash memory space integrated into the component.

Surrounding these base blocks, a set of means makes it possible to guarantee the resistance of all the parts against all the currently known attacks.

The resistance of all the parts is thus assessable, and assessed, according to the shared criteria, with an elevated protection target (EAL 4+) corresponding to what is currently optimal in terms of security. It is to be noted that this type of evaluation can in no manner be obtained or neared using classical methods available according to the prior art.

It is therefore a monolithic unit, traditionally manufactured for example by successive layers, according to the manufacturing techniques of integrated circuits known per se. As regards the integration of the sensor, the implementation of such an approach is also known, notably for photosensitive sensors, for example in CMOS technology, in the field of cameras and digital photographic equipment. We can notably refer to numerous patent documents related to these topics listed in the classification H01L27/14 of the IPC (International Patent Classification), and for example to the patent document FR-2819101, which is owned by AMTEL, with the title "Photosensitive Sensor in Integrated Circuit Technology" (not published on the priority date of this application), and others.

The applications of this type of component are all applications where it is necessary to prepare a physical or computer data access (data, room, etc.) with the presentation of a "code" known to the authorized person. In the case in point, the "code" is a piece of encrypted biometric information.

The application field of the invention is therefore very vast. It ranges from monitoring access to a smart card (in which case the recognition algorithm is placed on the card), to monitoring access to a hotel room, through the monitoring access to a mobile product (PDA, mobile phone, etc.).

More generally, the invention has applications in all of the following fields:
 physical access monitoring;
 computer data access monitoring;
 identifying of the holder of said device;
 implementing of mobile objects;
 banking services;
 electronic signatures.

Figure 2:
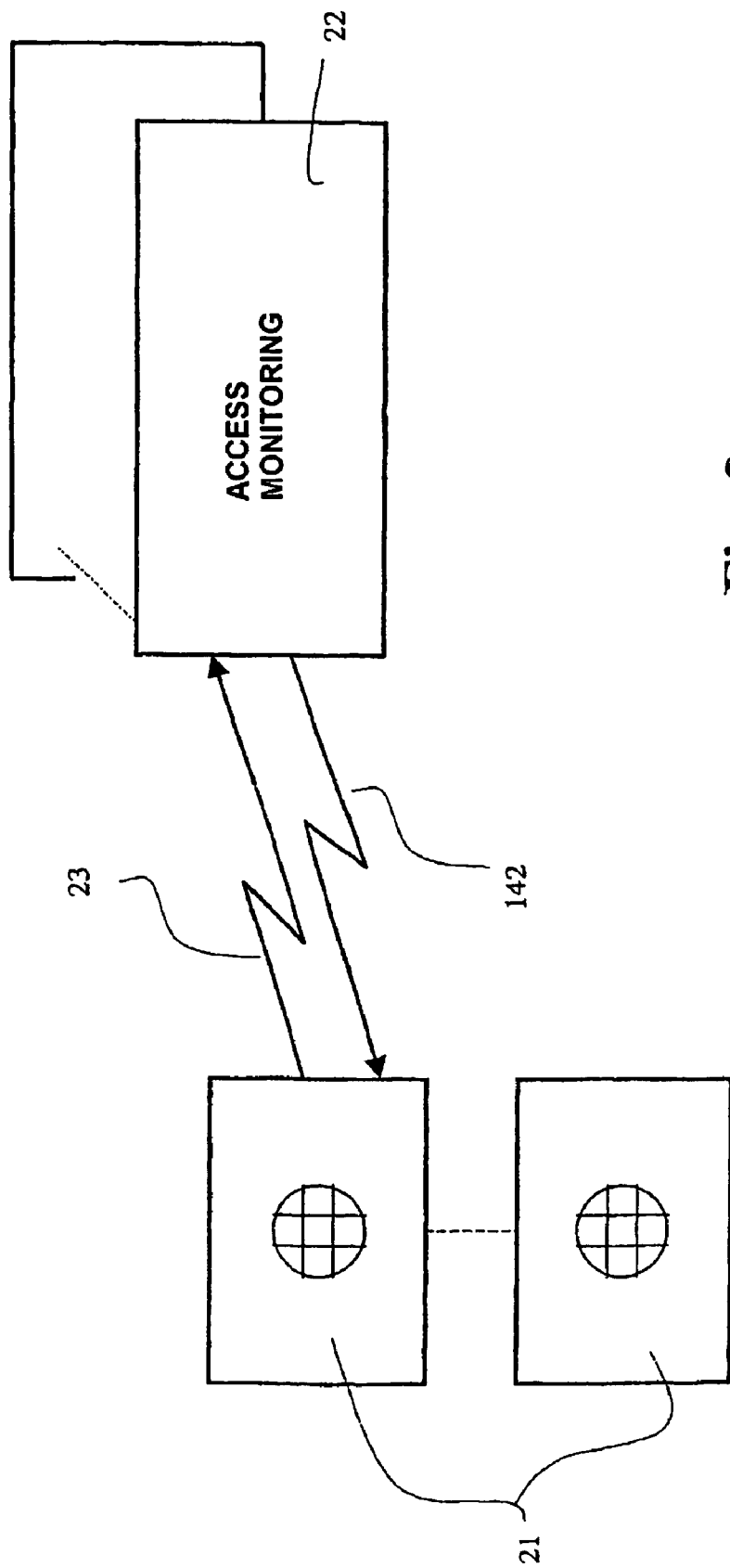
FIG. 2 presents a secured access system implementing the invention.

FIG. 2 illustrates an example of a system implementing recognition devices such as described above.

It comprises a plurality of recognition devices 21, distributed to a group of individuals, and at least one access monitoring device 22, capable of receiving and processing the encrypted information 23 produced by a device 21, so as to for example control the opening of a door or access to a file.

The access monitoring device 22 therefore comprises means of providing random data 142 for encrypting and of carrying out the corresponding decrypting.

The data exchanges between the recognition device 21 and the access monitoring device 22 can take place according to all the adequate techniques (contact using an adapted scanner, remote transmission by hertzian channel or infrared, etc.).

According to the applications, we can provide a single access monitoring device 22 (access to a room) or a large number of such reception devices (in the case of banking applications for example).

The recognition device 21 can create, or be mounted to, a mobile object (corresponding for example to a key or to current bank cards), or be integrated into an object (computer, car door, etc.) or a room, building or location.

The invention claimed is:

1. Device for recognizing at least one individual, characterized in that the device comprises in a monolithic integrated circuit obtained via an integration on a same silicon substrate of:
    at least one biometric information sensor;
    means of processing biometric information;
    cryptographic means, transmitting at least one piece of encrypted data representing at least one part of the biometric information and/or one piece of corresponding recognition information; and
    means of protection, denying access to flowing data, stored and/or processed in the monolithic integrated circuit, to create a secured perimeter,
    so that data exchanged by the sensor(s), the means of processing and the cryptographic means, and notably the biometric information, is solely kept in the monolithic integrated circuit, remaining inaccessible from outside of the monolithic integrated circuit, and that only the encrypted data is transmitted to the outside of the monolithic integrated circuit.

2. Device for recognizing at least one individual according to claim 1, characterized in that the means of protection denying access to data comprising at least one of means belonging to a group comprising:
    means of monitoring a main supply of the monolithic integrated circuit;
    means of monitoring characteristics of a clock synchronizing operation of the device;
    means of controlling a temperature of the monolithic integrated circuit;
    means of scrambling an electromagnetic interference induced by an internal processing of the device;
    means of anti-radiation protection;
    means of electromagnetic field shielding;
    means of physical shielding intended to prevent and/or detect any physical and/or electric attempt at interfering with the device;
    means of scrambling flowing information, processed and/or stored in the device.

3. Device for recognizing at least one individual according to claim 1, characterized in that the biometric information belongs to a group comprising:
    fingerprints;
    voiceprints;
    eye imprints;
    morphologic characteristics;
    behavioural characteristics.

4. Device for recognizing at least one individual according to claim 1, characterized in that the sensor(s) belong to a group comprising:
    heat sensors;
    pressure sensors;
    light sensors;
    movement detectors;
    radiation detectors;
    electric characteristic sensors;
    physical entity sensors.

5. Device for recognizing at least one individual according to claim 1, characterized in that the means of processing comprises means of formatting at least one signal transmitted by at least one of the sensors and means of extracting a formatting signal of at least one pertinent character, creating a digital signature making the device able to identify an individual in a unique manner.

6. Device for recognizing at least one individual according to claim 1, characterized in that the cryptographic means provide a cryptographic signature, calculated with help of at least one key stored in a storage unit of the monolithic integrated circuit.

7. Device for recognizing at least one individual according to claim 6, characterized in that the cryptographic signature also takes into account at least one random parameter generated and communicated by means independent of the monolithic integrated circuit.

8. Device for recognizing at least one individual according to claim 1, characterized in that the device comprises means of recognizing at least one individual, according to reference data stored in the monolithic integrated circuit.

9. Device for recognizing at least one individual according to claim 8, characterized in that the means of recognition transmit a piece of recognizing information, indicating if an individual is or is not recognized, the recognition information being encrypted before being transmitted to the outside of the monolithic integrated circuit.

10. Device for recognizing at least one individual according to claim 1, characterized in that the monolithic integrated circuit comprises a storage unit comprising at least one of the elements belonging to a group comprising:
    at least one cryptographic key;
    at least one secured processing mechanism of cryptographic keys;
    at least one piece of reference data representative of an individual;
    data and/or programs necessary for an implementation of the means present in the monolithic integrated circuit.

11. Device for recognizing at least one individual according to claim 10, characterized in that the storage unit comprises at least one digital data memory.

12. Device for recognizing at least one individual according to claim 11, characterized in that the digital data memory (ies) belong to a group comprising flash, EEPROM, EPROM, ROM, RAM, FERAM, MRAM and magnetic memories.

13. Device for recognizing at least one individual according to claim 1, characterized in that the monolithic integrated circuit comprises a fingerprint sensor, transmitting an imprint image, means of processing the generated image and means of extracting details on the processed image.

14. Device for recognizing at least one individual according to claim 1, characterized in that the cryptographic means implement at least one equipment calculation booster.

15. Device according to claim 1 applied to at least one field belonging to a group comprising:
    physical access monitoring;
    computer data access monitoring;
    identifying of the holder of the device;
    implementing of mobile objects;
    banking services;
    electronic signatures.

16. Method of recognizing at least one individual, characterized in that the method comprises the following stages, integrally implemented inside a monolithic integrated circuit:
    obtaining biometric information of the individual, with help of at least one sensor integrated into the monolithic integrated circuit;
    processing the biometric information;
    encrypting at least a part of the biometric information and/or a piece of corresponding recognition information;

transmitting the encrypted data to outside of monolithic integrated circuit, so that data exchanged by the sensor(s), the means of processing and the cryptographic means, and notably the biometric information, is solely kept in the monolithic integrated circuit, remaining inaccessible from the outside, and that only encrypted data is transmitted to the outside of the monolithic integrated circuit.

17. Method of recognizing at least one individual according to claim 16, characterized in that the monolithic integrated circuit defines a secured perimeter, by implementing means of protection denying access to flowing data, stored or processed in the monolithic integrated circuit.

18. Method of recognizing at least one individual according to claim 16, characterized in that the method implements at least one recognition device comprising the monolithic integrated circuit and at least one access monitoring device linked up to the recognition device, capable of receiving and processing encrypted data transmitted by the recognition device(s), and consequently of authorizing or refusing access to at least one piece of data, at least one object and/or at least one site.

19. Method according to claim 16 applied to at least one field belonging to a group comprising:
   physical access monitoring;
   computer data access monitoring;
   identifying of the holder of the device;
   implementing of mobile objects;
   banking services;
   electronic signatures.

20. Access monitoring device comprising means of access authorization or refusal to at least one piece of data, at least one object and/or at least one site, characterized in that the device comprises means for receiving and processing encrypted data provided by at least one device for recognizing at least one individual, the device being comprised in a monolithic integrated circuit obtained via an integration on a same silicon substrate of:
   at least one biometric information sensor;
   means of processing biometric information;
   cryptographic means, transmitting at least one piece of encrypted data representing at least one part of the biometric information and/or one piece of corresponding recognition information; and
   means of protection, denying access to the flowing data, stored and/or processed in the monolithic integrated circuit, to create a secured perimeter,
   so that data exchanged by the sensor(s), the means of processing and the cryptographic means, and notably the biometric information, is solely kept in the monolithic integrated circuit, remaining inaccessible from outside of the monolithic integrated circuit, and that only the encrypted data is transmitted to the outside of the monolithic integrated circuit.

21. An access monitoring device according to claim 20 employed in a system for monitoring access to at least one piece of data, at least one object and/or at least one site.

* * * * *